United States Patent
Senatori

(10) Patent No.: US 9,778,684 B2
(45) Date of Patent: Oct. 3, 2017

(54) LOCKING ARMS FOR COMPUTING DEVICES

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/026,343

(22) PCT Filed: Nov. 15, 2013

(86) PCT No.: PCT/US2013/070438
§ 371 (c)(1),
(2) Date: Mar. 31, 2016

(87) PCT Pub. No.: WO2015/073038
PCT Pub. Date: May 21, 2015

(65) Prior Publication Data
US 2016/0252927 A1    Sep. 1, 2016

(51) Int. Cl.
*G06F 1/16*    (2006.01)
*H05K 7/00*    (2006.01)

(52) U.S. Cl.
CPC ............ *G06F 1/162* (2013.01); *G06F 1/1681* (2013.01); *G06F 1/166* (2013.01); *G06F 1/1616* (2013.01); *G06F 1/1679* (2013.01)

(58) Field of Classification Search
CPC ...... G06F 1/1681; G06F 1/1616; G06F 1/162; G06F 1/1679; G06F 1/166; Y10S 345/905; Y10S 248/922; Y10T 16/538
See application file for complete search history.

(56) References Cited

U.S. PATENT DOCUMENTS 5,165,145 A    11/1992  Sherman
6,266,236 B1 *  7/2001  Ku ......................... G06F 1/162
                                                        312/223.1

(Continued)

FOREIGN PATENT DOCUMENTS

TW    200643686 A    12/2006
TW    M405138         6/2011

(Continued)

OTHER PUBLICATIONS

Wordman, P.B., Driving Convertibles & Merging Laptops + Tablets = Hybrids, May 2, 2012.

*Primary Examiner* — James Wu
(74) *Attorney, Agent, or Firm* — HP Patent Department

(57) ABSTRACT

A computing device may include a base member, a display member, a first hinge, a second hinge, a stop, and a locking arm. The first hinge may be attached to the base member to rotate the base member and the display member relative to each other about a first pivotal axis of rotation. A second hinge may be attached between the first hinge and the display member to rotate the base member and the display member relative to each other about a second pivotal axis of rotation to transition the computing device between a laptop mode and a tablet mode. The stop may be in the first hinge. The locking arm may be to engage the stop when the computing device is in the tablet mode to limit rotation of the base member and the display member relative to each other about the first pivotal axis.

19 Claims, 10 Drawing Sheets

(56) References Cited

U.S. PATENT DOCUMENTS

| | | | |
|---|---|---|---|
| 6,771,494 | B2 | 8/2004 | Shimano |
| 6,903,927 | B2 | 6/2005 | Anlauff |
| 7,239,505 | B2 | 7/2007 | Keely et al. |
| 2009/0049649 | A1* | 2/2009 | Lin .................... E05D 11/06 16/387 |
| 2009/0083943 | A1 | 4/2009 | Chen |
| 2011/0170252 | A1 | 7/2011 | Jones et al. |
| 2012/0243164 | A1* | 9/2012 | Lin .................... G06F 1/162 361/679.27 |
| 2013/0010424 | A1 | 1/2013 | Degner |
| 2013/0021723 | A1* | 1/2013 | Harper ............... F16M 11/10 361/679.01 |
| 2013/0214661 | A1* | 8/2013 | McBroom ......... G06F 1/1667 312/325 |

FOREIGN PATENT DOCUMENTS

| | | |
|---|---|---|
| TW | I409023 | 9/2013 |
| WO | WO-2013182396 | 7/2013 |
| WO | WO-2013-114820 | 8/2013 |

* cited by examiner

LOCKING ARMS FOR COMPUTING DEVICES

BACKGROUND

Various mobile computing devices are available such as laptops and tablets. A laptop may include a display and a physical input device separate from the display. A tablet computer may be a one-piece mobile device having a touchscreen that may be navigated by a fingertip or stylus.

BRIEF DESCRIPTION OF THE DRAWINGS

Some examples are described with respect to the following figures.

DETAILED DESCRIPTION

Figure 1:
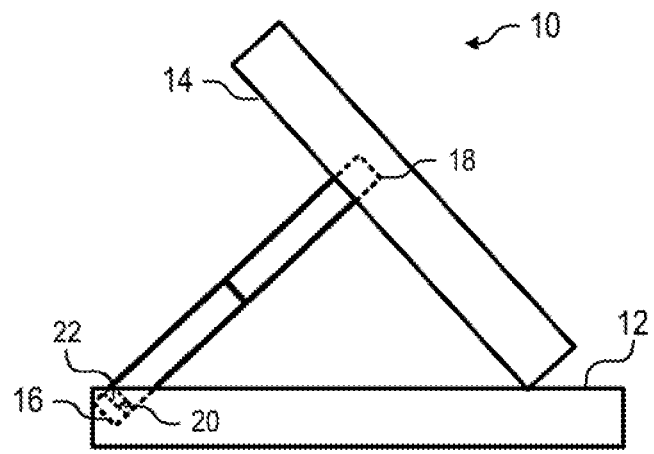
FIG. 1 is a schematic view of a computing device according to some examples.

The following terminology is understood the mean the following when recited by the specification or the claims. The singular forms "an," and "the" mean "one or more." The term "attached" includes both direct forms of attachment and indirect forms of attachment such as where one or more intervening elements may be included between the parts being attached. The terms "including" and "having" are intended to have the same inclusive meaning as the term "comprising."

Some existing computing devices having multiple modes of operation may have unwieldy design, and may not adequately provide optimal positioning of its components in the various modes of operation. Moreover, such computing devices may, in some examples, be damaged due to contact between a base member and parts of a hinge assembly. Accordingly, the present disclosure concerns locking arms for computing devices.

In some examples, the computing devices of the present disclosure that can be transitioned between a "laptop mode" to operate as a laptop and a "tablet mode" to operate as a tablet. In some examples, the computing devices may also include a "closed mode" in which the computing device is closed, for example when the display screen and the keyboard inwardly face each other. However, in other examples, a closed mode may not be included. The term "computing device" encompasses any device with computing capability. The term "laptop" encompasses any of a number of different computing devices having a display screen and a separate input device such as a keyboard. The term "tablet" encompasses any of a number of different computing devices having a display screen that operates as a touchscreen that can be navigated by an input stimulus such as a fingertip or stylus.

The computing device may include a display member attached to a base member via a hinge assembly having a flexible hinge and a friction hinge. The flexible hinge may be attached to the display member, and the friction hinge may be attached to the base member. The display member may pivot about two pivotal axes of rotation relative to the base member. The two pivotal axes may operate independently of each other. The computing device may be transitioned between its modes using the two pivotal axes, as follows.

In the closed mode, the display member may be stacked in parallel on the base member such that a display screen of the display member and a keyboard of the base member are facing inwardly toward each other. In the laptop mode, the display member may be oriented at an angle, for example an obtuse angle, relative to the base member to allow the user to view a display screen of the display member and to allow access to a keyboard of the base member. A user may transition the computing device between the closed mode and the laptop mode by rotating the display member about the first pivotal axis of rotation, which may be implemented by the friction hinge. In the tablet mode, the display member may be oriented such that the display screen is facing outwardly away from the base member, and such that the keyboard of the base member is facing inwardly toward the back side of the display member. The display screen may be used as a touchscreen that may be navigated by a fingertip or stylus. The user may transition the computing device between the laptop mode and the tablet mode by rotating the display member about the second pivotal axis of rotation, which may be implemented by the flexible hinge.

The present disclosure may, in some examples, provide protection from damage resulting from contact between the base member and parts of the hinge assembly. In some examples, the present disclosure may provide superior positioning of the display member for use by a user. Examples of computing devices of the present disclosure are described as follows.

FIG. 1 is a schematic view of a computing device 10 according to some examples. The computing device 10 may include a base member 12, a display member 14, a first hinge 16, a second hinge 18, a stop 20, and a locking arm 22. The first hinge 16 may be attached to the base member 12 to rotate the base member 12 and the display member 14 relative to each other about a first pivotal axis of rotation. A second hinge 18 may be attached between the first hinge 16 and the display member 14 to rotate the base member 12 and the display member 14 relative to each other about a second pivotal axis of rotation to transition the computing device 10 between a laptop mode and a tablet mode. The stop 20 may be in the first hinge 16. The locking arm 22 may be to engage the stop 20 when the computing device 10 is in the tablet mode to limit rotation of the base member 12 and the display member 14 relative to each other about the first pivotal axis.

Figure 2:
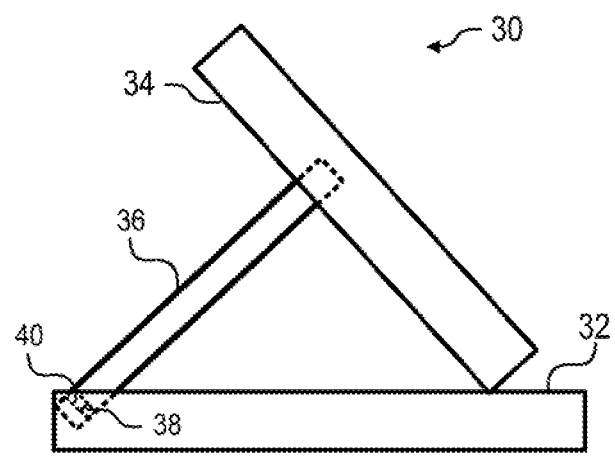
FIG. 2 is a schematic view a computing device according to some examples.

FIG. 2 is a schematic view of a computing device 30 according to some examples. The computing device 30 may include a base member 32, a display member 34, a hinge assembly 36, a stop 38, and a locking arm 40. The hinge assembly 36 may be attached between the base member 32 and the display member 34 to rotate the base member 32 and the display member 34 relative to each other about a first pivotal axis of rotation and about a second pivotal axis of rotation to transition the computing device 30 between a laptop mode and a tablet mode. The stop 38 may be in the hinge assembly 36. The locking arm 40 may be to contact the stop 38 when the computing device 30 is in the tablet mode to limit rotation of the base member 32 and the display member 34 relative to each other about the first pivotal axis, the locking arm 40 not to contact the stop 38 when the computing device 30 is in the laptop mode.

Figure 7:
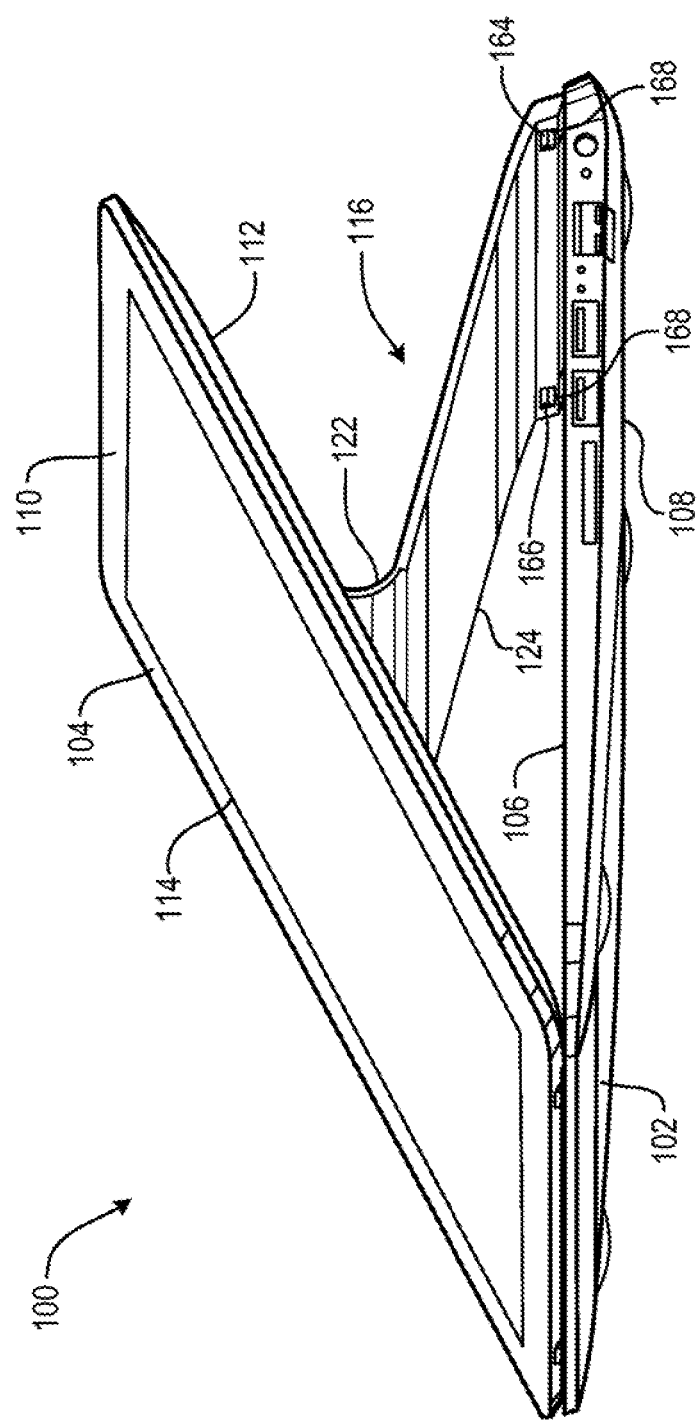
FIG. 7 is a perspective view of a computing device in a front position of a tablet mode according to some examples.
Figure 8:
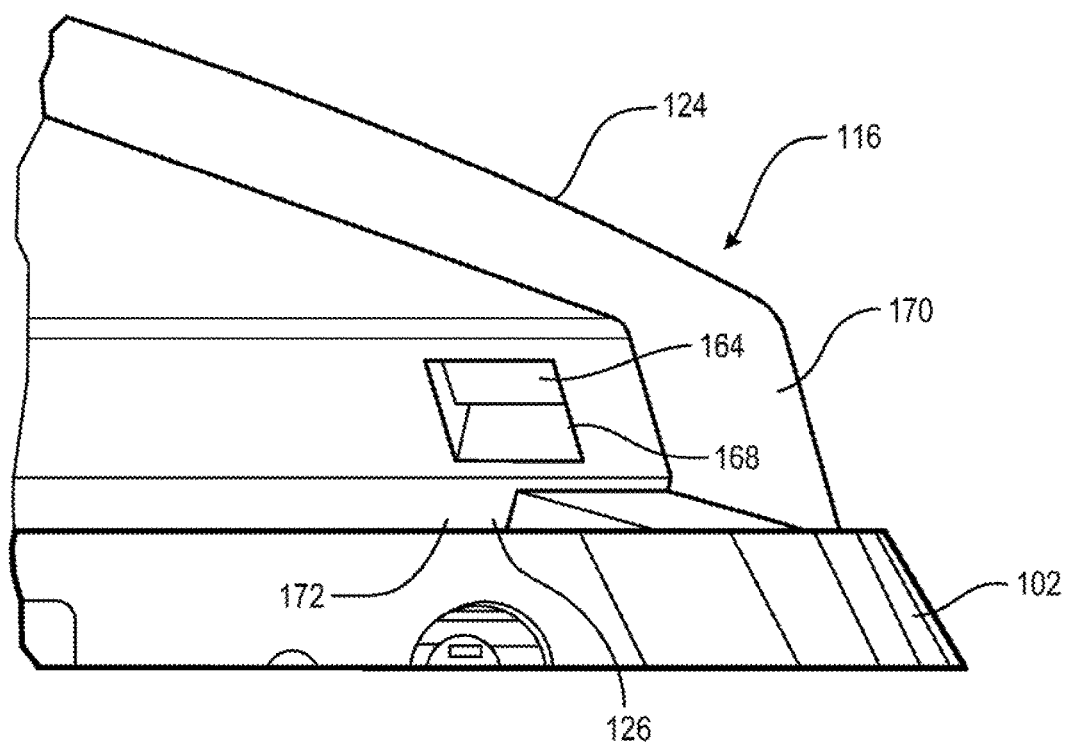
FIG. 8 is a close-up perspective view of a locking arm of the computing device of FIG. 7 according to some examples.

FIG. 3-6 respectively are perspective views of a computing device 100 in a closed mode, laptop mode, rear position of a tablet mode, and front position of the tablet mode according to some examples. FIG. 7 is another perspective view of the computing device 100 in a front position of a tablet mode according to some examples. FIGS. 3-7 each show locking arms 164 and 166. FIG. 8 is a close-up perspective view of the locking arm 164.

The computing device 100 may include a base member 102 and a display member 104. The base member 102 may have a first side 106 and a second side 108. The base member 102 may include input devices such as a keyboard 107 and a touchpad 109 housed on the first side 106. In some examples, the base member 102 may be a capacitive keyboard. The display member 104 may have a first side 110 and a second side 112. The display member 104 may include a display screen 114 housed on the first side 110. The display screen 114 may be liquid-crystal display (LCD) and/or may be touch-enabled to allow navigation by a fingertip or stylus. In some examples, the display screen 114 may not be touch-enabled. The display member 104 may also include a camera, speakers, and/or antennas, for example. One or both of the base member 102 and the display member 104 may house a processor and a memory. The computing device 100 may include a hinge assembly 116. The hinge assembly 116 may include a second hinge 122, a rigid plate 124, and first hinges 126. A "hinge" allows two elements attached to the hinge to be rotated relative to each other about a pivotal axis of rotation.

Figure 5:
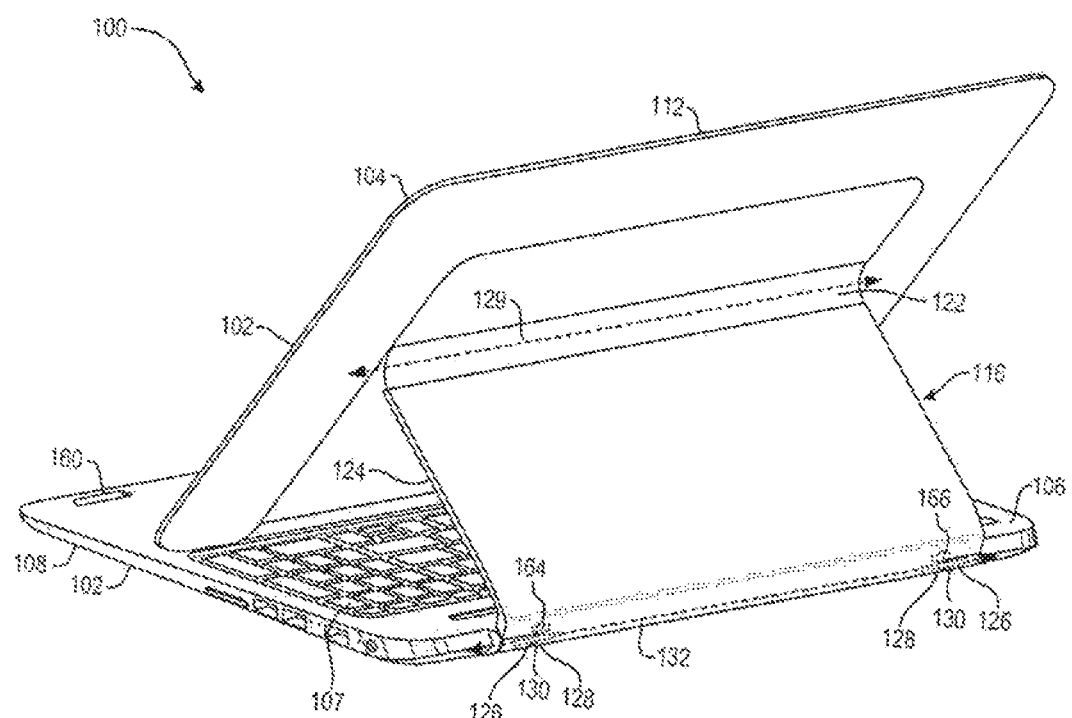
FIG. 5 is a perspective view of a computing device in a rear position of a tablet mode according to some examples.

The computing device 100 may be transitioned between the closed mode and the laptop mode by rotating the display member 104 relative to the base member 102 about a first pivotal axis of rotation 132 using the fit hinges 126. Additionally, the computing device 100 may be transitioned between the laptop mode and the tablet mode by rotating the display member 104 relative to the base member 102 about a second pivotal axis of rotation 129 using the second hinge 122. Additionally, the transition between the laptop mode and the tablet mode may include rotating the display member 104 relative to the base member 102 about the first pivotal axis of rotation 132 using the first hinges 126. In some examples, the transition between the laptop mode and the tablet mode may be made by rotating the display member 104 relative to the base member 102 about the second pivotal axis 129 and the first pivotal axis 132 using the second hinge 122 and the first hinges 126. In some examples, rotation may be performed about both the second and first pivotal axes 129 and 132 simultaneously. The second and first pivotal axes 129 and 132 may be longitudinal axes. Example second and first pivotal axes 129 and 132 are shown in FIG. 5.

In the closed mode, the display member 104 may be stacked in parallel on the base member 103 such that the display screen 114 and the keyboard 107 may be facing inwardly toward each other. In the laptop mode, the display member 104 may be oriented at an angle relative to the base member 102 to allow the user to view a display screen 114. In the tablet mode, the display member 104 may be oriented such that the display screen 114 is facing outwardly away from the base member 102, and such that the keyboard 107 is facing inwardly toward the display member 104.

The second hinge 122 may be a flexible hinge or any other suitable hinge. For example. For example, the second hinge 122 may be attached to the display member 104 and to the rigid plate 124 by an adhesive such as an epoxy resin. The second hinge 122 may be a "flexible sheet", which is a flexible element having a thickness that is small relative to its length and width. In some examples, the second hinge 122 may be made of a flexible polymer, for example nylon or polypropylene, or of a flexible metal, such as spring steel or stainless steel, or other flexible materials, or combinations thereof. An element that is "flexible" has suitable dimensions and/or is made of suitable materials such that the element is capable of bending without breaking.

The first hinges 126 may be friction hinges. For example, the friction first hinges 126 may rotatably attach the base member 102 about the first pivotal axis of rotation 132 to the remainder of the elements of the hinge assembly 116. A "friction hinge" is a hinge having a frictional interference fit between its rotating elements. For example, each friction fir hinge 126 may include a gudgeon member 128 and a pintle member 130 longitudinally inserted through the gudgeon member 128 along the first pivotal axis 132. The pintle member 130, shown in FIG. 3, may frictionally engage the inner surface of the gudgeon member 128 by way of an interference fit wherein the inner surface may exert an inward radial force on the pintle member 130, which may exert a reciprocal outward force on the inner surface. The frictional engagement of these cylindrical mating surfaces may allow the angular position between the hinge assembly 116 and the base member 102 to be maintained or held in place at any desired angle, wherein the permitted range of angles may be between a minimum angle of zero degrees and a maximum angle of 180 degrees, for example. In some examples, the first hinges 126 may be made of a metal such as spring steel or stainless steel, or other materials, or combinations thereof.

The rigid plate 124 may have suitable dimensions and be made of suitable materials to provide stiffening and/or structural reinforcement to the hinge assembly 116, and/or to aid in rotation of the display member 104 relative to the base member 102. Inclusion of the rigid plate 124 may thus increase the overall thickness of the hinge assembly 116. However, in some examples, the second hinge 122 may extend to the first hinges 126, such that there may be no rigid plate 124. An element that is "rigid" has suitable dimensions and/or is made of suitable materials such that it cannot be bent without breaking.

The computing device 100 may include one or more fasteners to secure the hinge assembly 116 in the display member 104 when the computing device 100 is in the closed mode or the laptop mode. For example, the computing device 100 may include one or more of magnetic fasteners, mechanical fasteners, and other types of fasteners.

Figure 4:
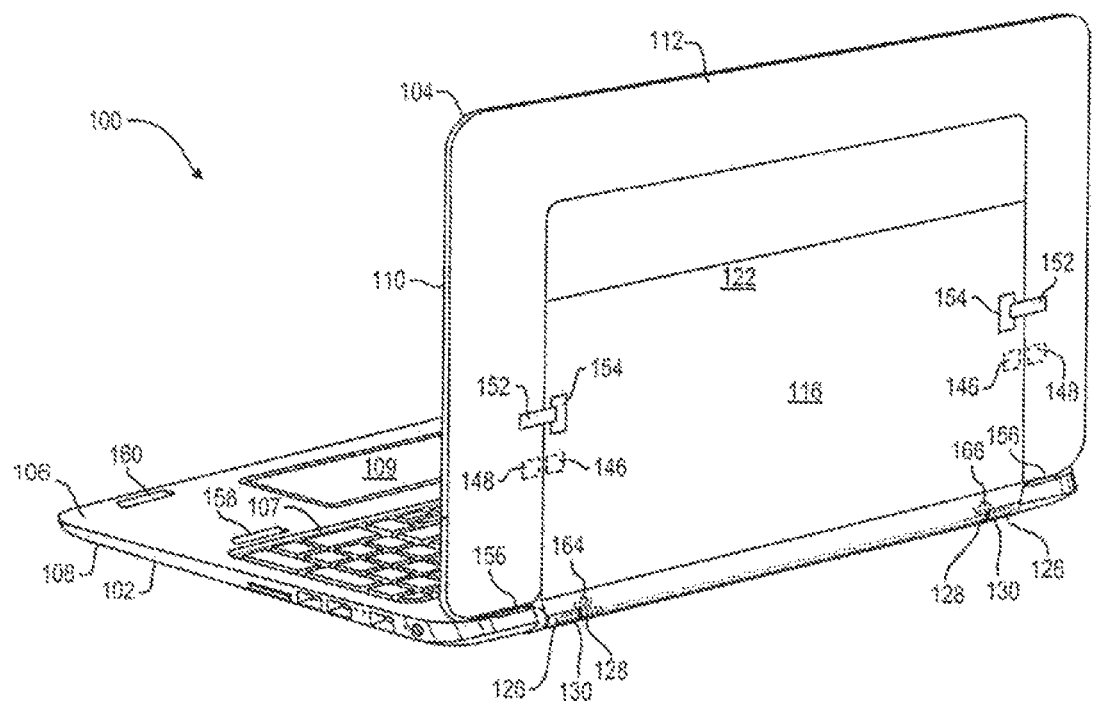
FIG. 4 is a perspective view of a computing device in a laptop mode according to some examples.

In some examples, each magnetic fastener may include a magnetic member 146 in the rigid plate 124 and a magnetic member 148 in the display member 104, as shown in FIG. 4. When the magnetic members 146 and 148 are in proximity, for example when the computing device 100 is in the closed mode or the laptop mode, the magnetic members 146 and 148 may be sufficiently attracted such that the hinge assembly 116 is held in place in the display member 104. The hinge assembly 116 and display member 104 may be pulled away from each other to transition the computing device 100 to the tablet mode, such that the magnetic members 146 and 148 are no longer in proximity and thus are no longer sufficiently attracted to hold the hinge assembly 116 in the display member 104. As shown in FIG. 4, a magnetic fastener may be included in each side of the display member 104. In some examples, the magnetic members 148 may be included in the second hinge 122 or attachment portion 127 rather than in the rigid plate 124. A "magnetic member" is any object made of a suitable material such that it experiences a force in the presence of a magnetic field, and/or itself generates a magnetic field. In some examples, one of both of the magnetic members 146 and 148 may be a permanent magnet such as a ferromagnet. In some examples, one or both of the magnetic members 146 and 148 may be an antiferromagnet, a ferrimagnet, a paramagnet, a diamagnet, an electromagnet magnetized by current provided by the computing device 100, or other magnetic member. In some examples, one of the magnetic members 146 or 148 may be a permanent magnet, and the other may be any suitable metallic element.

In some examples, each mechanical fastener may include a latch member 152 on the display member 104 and a receiving member 154 on any part of the hinge assembly 116. The hinge assembly 116 may be moved into the display member 104, and the latch member 152 may be inserted into the receiving member 154 to lock the hinge assembly 116 into the display member 104, as shown in FIG. 4. In some examples, the latch member 152 may instead be on the hinge assembly 116 and the receiving member 154 may instead be on the display member 104.

Figure 3:
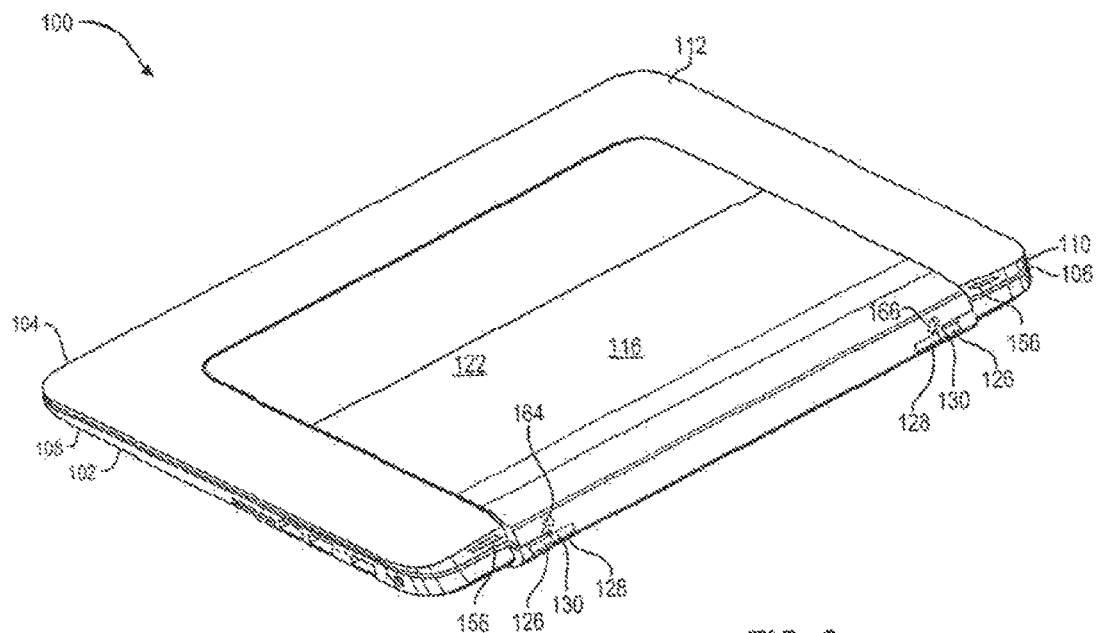
FIG. 3 is a perspective view of a computing device in a closed mode according to some examples.
Figure 6:
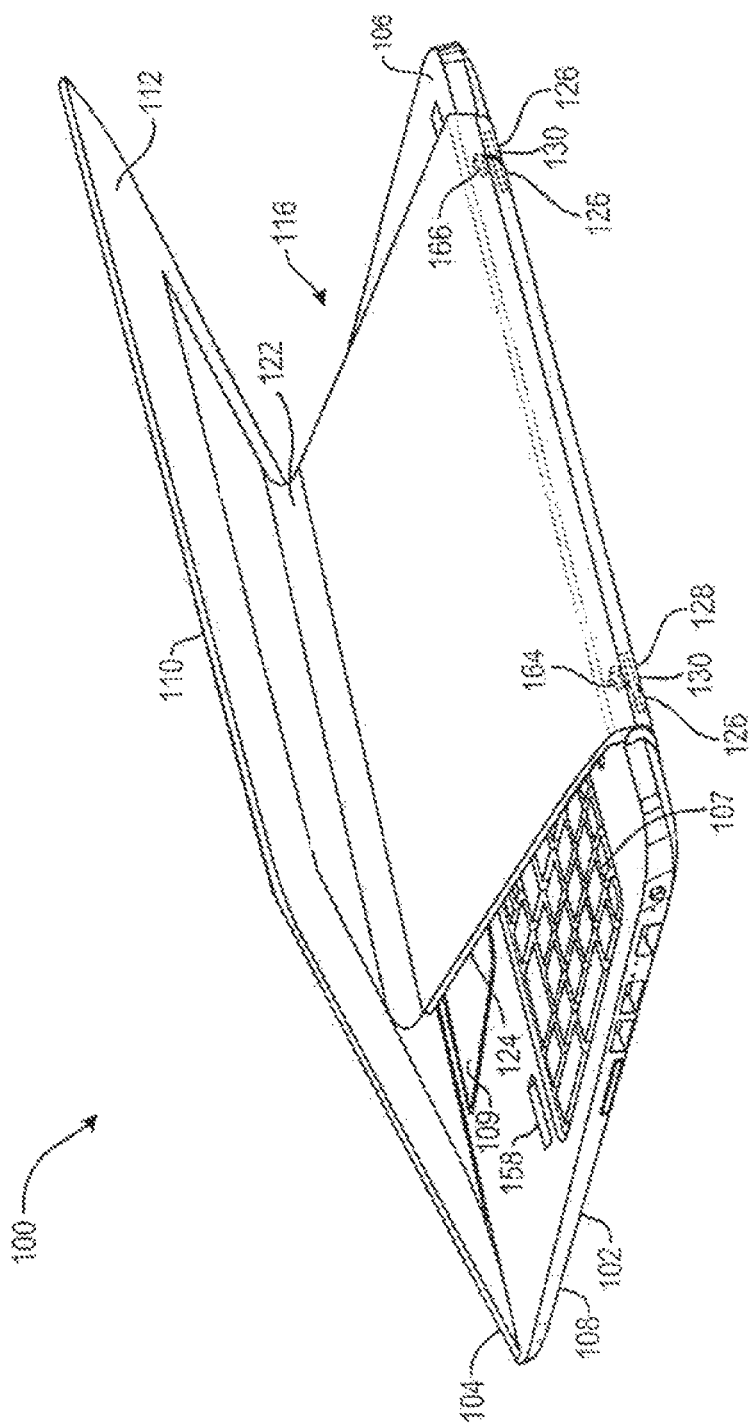
FIG. 6 is a perspective view of a computing device in a front position of a tablet mode according to some examples.

Rotation of the display member 104 about the second pivotal axis of rotation 129 may be accomplished by bending the second hinge 122 from the unbent configuration of FIG. 4 into any of the bent configurations shown in FIGS. 5-6. For example, the second hinge 122 may bend away from the display member 104. In some examples, the second hinge 122 may have a maximum curvature, such as 180 degrees to form a U-shaped curve. In some examples, the second hinge 122 may be biased toward the unbent configuration as shown in FIGS. 3-4. In these examples, the bent configurations of the tablet mode in FIGS. 5-6 may be maintained by the weight of the display member 104 and/or by locating elements, as will be discussed in more detail. In other examples, the second hinge 122 may be biased toward any one of the bent configurations of FIGS. 4-6. In these examples, the unbent configurations of FIGS. 3-4 may be maintained by the fasteners discussed earlier. However, the fasteners may be included to add stability regardless of the biasing choice of the second hinge 122.

In examples in which the computing device 100 does not have a closed mode, the first hinges 126 may not rotate sufficiently to transition the computing device 100 from the laptop mode to the closed mode. Thus, for example, the computing device 100 may instead be stowed away in the tablet mode.

In some examples, the lower front edge of the display member 104 may hover over the base member 102 in the tablet mode. In other examples, the display member 104 may contact any position of the base member 102, along a continuum between the laptop mode of FIG. 4, the rear position of the tablet mode of FIG. 5, and the front position of the tablet mode of FIG. 6. The contact may, in some examples, provide additional stability.

In some of the examples in which the front edge of the display member 104 contacts the base member 102, various locating elements may be included in the base member 102 and/or the display member 104 to locate the display member 104 relative to the base member 102 in one or more positions. Thus, additional stability may be provided to the display member 104, such that if a user pushes against the display screen 114, the display member 104 may not move relative to the base member 102.

In some examples, the locating, elements may include protrusions 156, e.g. bumps or nubs, on the bottom of the display member 104, and recesses 158 and 160 in the base member 102. As will be shown in more detail in FIGS. 9-10, the protrusions 156 may have an elongated and rounded shape. In some examples, the protrusions 156 may have thicknesses suitable such that they may be inserted into one or more recesses 158 or 160 to locate the display member 104 in the base member 102 at various positions, as shown in FIGS. 5-6. For example, two recesses 158, one of which is shown in FIGS. 4, 6, and 7, may be included between the keyboard 107 and touchpad 109 of the base member 102 to allow two corresponding protrusions 156 to be inserted therein to locate the display member 104 and base member 102 in the rear position of the tablet mode, as shown in FIG. 3. Additionally, two recesses 160, one of which is shown in FIGS. 4-5, may be included at the front of the base member 102 to allow the two corresponding protrusions 156 to be inserted therein to locate the display member 104 and base member 102 in the front position of the tablet mode, as shown in FIG. 4. The second recess 158 and second recess 160 may be on the other side of the base member 102. The protrusions 156 may be made of any suitable material, for example a polymer, plastic, rubber, polyurethane, or a combination thereof. The material may be a soft material such that damage to the base member 102 may be minimized. However, in other examples, a hard material such as a metal, for example stainless steel or spring steel, may be used.

In other examples, for example those in which there are no protrusions 156, the display member 104 may have a thickness suitable such that the display member 104 may be directly inserted into recesses to locate the display member 104 in the base member 102. For example, one longitudinal recess may be included between the keyboard 107 and touchpad 109, and may extend between the entire length of the base member 102 between the left and right sides of the base member 102 to locate the display member 104 and base member 102 in the rear position of the tablet mode. Another longitudinal recess may be included at the front of the display member 104 and may extend between the entire length of the base member 102 between the left and right sides of the base member 102 to locate the display member 104 and base member 102 in the front position of the tablet mode.

In some examples, the locating, elements may include protrusions on the base member 102. For example, one or more protrusions may be included between the keyboard 107 and touchpad 109, and may operate as stops to locate the display member 104 and base member 102 in the rear position of the tablet mode. Additionally, one or more protrusions may be included at the front of the base member 102, and may operate as stops to locate the display member 104 and base member 102 in the front position of the tablet mode.

In further examples, the locating elements may include magnetic members. One or more magnetic members may be included in the bottom of the display member 104. One or more magnetic members may be included between the keyboard 107 and touchpad 109, and may attract the one or more magnetic members of the display member 104 to locate the display member 104 and base member 102 in the rear position of the tablet mode. Additionally, one or more magnetic members may be included at the front of the base member 102, and may attract the one or more magnetic members of the display member 104 to locate the display member 104 and base member 102 in the front position of the tablet mode. In some examples, any of the magnetic members may be a permanent magnet such as a ferromagnet. In some examples, any of the magnetic members may be an antiferramagnet, a ferrimagnet, a paramagnet, a diamagnet, an electromagnet magnetized by current provided by the computing device 100, or other magnetic member. In some examples, the magnetic member of the display member 104 may be a permanent magnet, and the magnetic member of the base member 102 may be any suitable metallic element. In some examples, the magnetic member of the base member 102 may be a permanent magnet, and the magnetic member of the display member 104 may be any suitable metallic element.

In some examples, the locating elements may include detents in the display member 104. The detents may allow up to a certain angle of rotation between the hinge 122 and the display member 104, but may not allow any further rotation. The maximum angle may be between about 30 and about 40 degrees, about 40 and about 50 degrees, about 50 and about 60 degrees, about 60 and about 70 degrees, about 70 and about 80 degrees, and/or about 80 and 90 degrees.

As shown in FIGS. 7-8, the locking arms 164 and 166 may be exposed at an opening 168 in the hinge assembly 116. The gudgeon member 128 may include a cylindrical portion 172 and a portion 170 attached to the cylindrical portion 172. As shown, the opening 168 may be on the portion 170. In some examples, the locking arms 164 and 166 may not be visible, as they may be covered by the hinge assembly 116.

Figure 9:
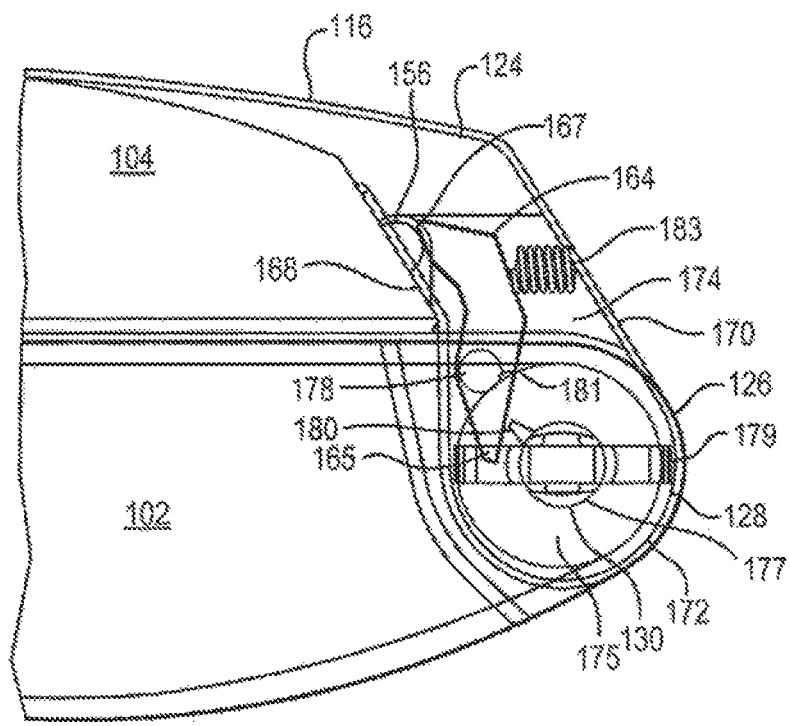
FIG. 9 is a close-up side view a locking of a computing device in a closed mode according to some examples.
Figure 10:
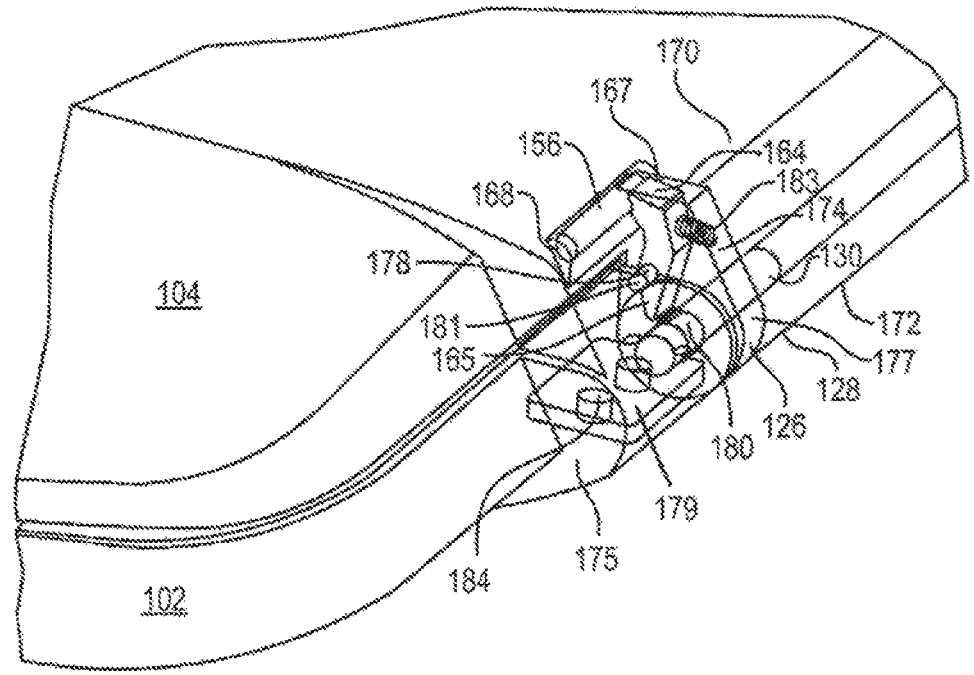
FIG. 10 is a close-up perspective view of the locking arm of a computing device in a closed mode according to some examples.
Figure 11:
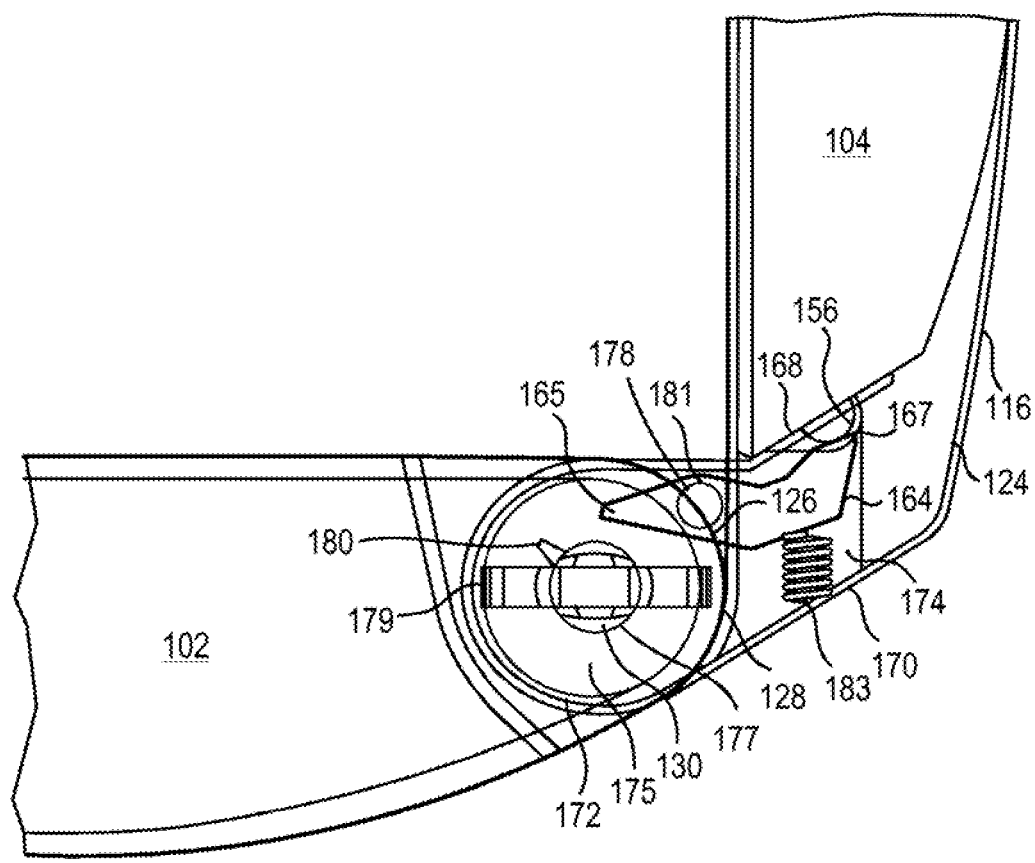
FIG. 11 is a close-up side view of a locking arm of a computing device in a laptop mode according to some examples.
Figure 12:
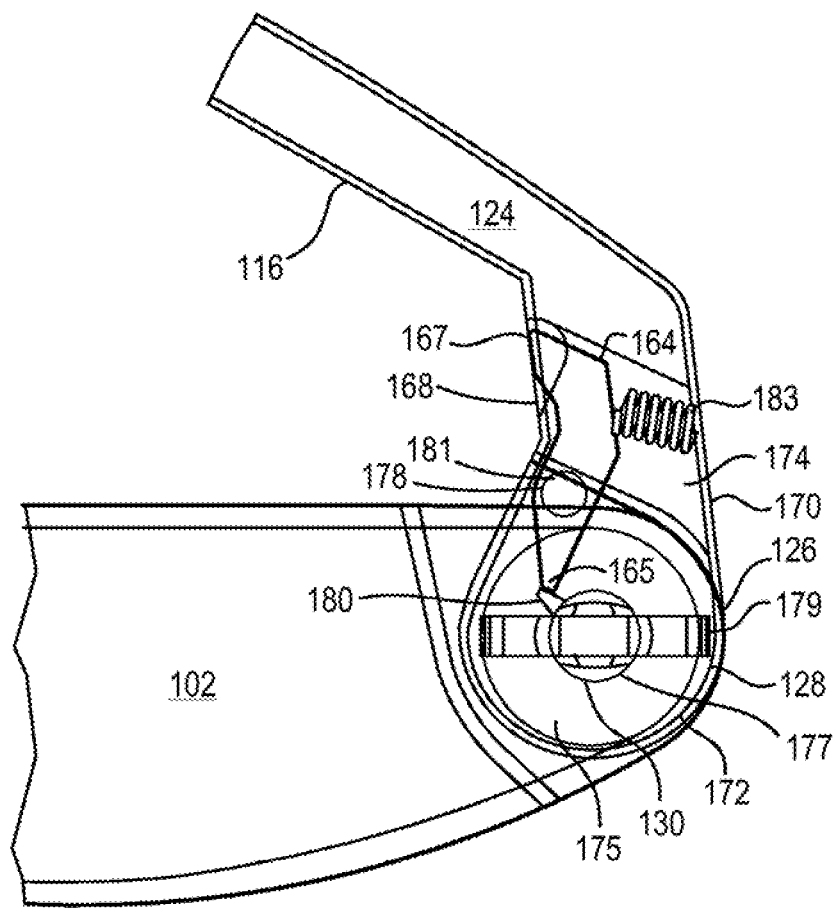
FIG. 12 is a close-up side view of a locking arm of a computing device in a front position of a tablet mode according to some examples.

FIGS. 9-12 show the locking arm 164 and surrounding elements of the computing device 100 in more detail. The locking arm 166 and its surrounding elements may be similar to the locking arm 164 and its surrounding elements, except that they may be a mirror image of the locking arm 164 and its surrounding elements. FIG. 9 is a close-up side view the locking arm 164 of the computing device 100 in a closed mode according to some examples. FIG. 10 is a close-up perspective view of the locking arm 164 of the computing device 100 in a closed mode according to some examples FIG. 11 is a close-up side view of the locking arm 164 of a computing device 100 in a laptop mode according to some examples. FIG. 12 is a close-up side view of the locking arm 164 of a computing device 100 in a front position of a tablet mode according to some examples.

As shown, the pintle member 130 may include a mounting plate 179 and a cylindrical shaft member 177 attached to the mounting plate 179. The mounting plate 179 may be located in a cavity 175 in the base member 103. The mounting plate 179 may, for example, be a rectangular plate having openings 184 to allow fasteners to be inserted therethough to rigidly attach the mounting plate 179 to the base member 102. As discussed earlier, the cylindrical portion 172 of the gudgeon member 128 may frictionally rotate relative to the cylindrical shaft member 177. A stop 180 may be in the first hinge 126. For example, the stop 180 may be attached to the cylindrical portion 172, as shown in FIGS. 9-10. However, in other examples, the stop 180 may be attached to the mounting plate 179 or a part of the base housing 103 such as in the cavity 175. The stop 180 may have a generally triangular shape, as shown. However, the stop 180 may have other shapes as well. A "stop" is a mechanical member to limit motion of another mechanical member.

The locking arm 164 may be located in a cavity 174 that extends through the cylindrical portion 172 and the portion 170 of the gudgeon member 128. The locking arm 164 may have an opening 178 to allow a fastener 181 to be inserted therethough such that the locking arm 164 may be rotatably attached to the fastener 181. Both ends of the fastener 181 may be rigidly attached to the first hinge 126, for example to the gudgeon member 128. While rotatably attached to the fastener 181, the locking arm 164 may be free to rotate relative to the fastener 181. The locking arm 164 may be spring loaded. For example, a spring 183 may attach the locking arm 164 to the hinge 126, for example to the gudgeon member 128 to bias the locking arm 164, as shown. The locking arm 164 and the spring 183 may be made of any suitable material, for example metals such as steel e.g. stainless steel or spring steel, zinc, other materials, or any combination thereof. A "spring" is any device that may have a biased position when no force is applied to the spring and an unbiased position, e.g. an extended position or compressed position, when a force is applied to the spring.

The locking arm 164 may, for example, have a generally L-shape, as shown. A first end 167 of the locking arm 164 may be to contact the protrusion 156. A second end 165 of the locking arm 164 may be to contact the stop 180. The first and second ends 167 and 165 may be facing generally perpendicular to each other, as shown in the FIGS. 9-12. In other examples, the locking arm 164 may have any other suitable shape as long as it has two ends or sections to allow contact with the protrusion 156 and stop 180.

As shown in FIGS. 9-10, when the computing device 100 is in the closed mode, the first end 167 of the locking arm 164 may be engaging the protrusion 156, and the second end 165 may not be engaging the stop 180 to allow the base member 102 to contact the display member 104 in the closed mode. For example, locking arm 164 may be able to move counterclockwise beyond the stop 180 to allow the contact between the base member 102 and display member 104. Because the protrusion 156 may be pressing against the locking arm 164, the locking arm 164 may press against the spring 183 to cause the spring to be in an unbiased position, e.g. a compressed position as shown in FIGS. 9-10.

As shown in FIG. 11, the computing device 100 may be transitioned from the closed mode to the laptop mode, and the locking arm 164 may be maintained in place, because the spring 164 may continue to be in the unbiased position.

As shown in FIG. 12, when the computing device is transitioned from the laptop mode to the tablet mode, the first end 167 of the locking arm 164 may not be engaging the protrusion 156, and the second end 165 may be engaging the stop 180 to limit rotation of the base member 102 and the display member 104 relative to each other about the first pivotal axis 132. The rigid plate 124 and second hinge 122 may thus move no closer to the base member 102 than as is shown in FIG. 12. For example, the limiting of movement may prevent the second hinge 122 and/or the rigid plate 124 from contacting the base member 104, as shown in FIGS. 6-7. Because the protrusion 156 may not be pressing against the locking arm 164, the spring may be returned to its biased position in which it is experienced no force, thus the locking arm 164 may move toward the opening 168.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A computing device comprising:
a base member;
a display member;
a first hinge attached to the base member to rotate the base member and the display member relative to each other about a first pivotal axis of rotation;
a second hinge attached between the first hinge and the display member to rotate the base member and the display member relative to each other about a second pivotal axis of rotation to transition the computing device between a laptop mode and a tablet mode;
a stop in the first hinge; and
a locking arm to:
engage the stop when the computing device is in the tablet mode to limit rotation of the base member and the display member relative to each other about the first pivotal axis, and
engage the display member when the computing device is in the laptop mode such that the locking arm is not to engage the stop, to allow the base member to contact the display member in a closed mode.

2. The computing device of claim 1 further comprising a spring attached between the locking arm and a portion of a gudgeon member of the first hinge, the spring to be in a biased position when the locking arm engages the stop.

3. The computing device of claim 1 wherein the first hinge is to rotate the base member and the display member relative to each other about the first axis of rotation to transition the computing device between the laptop mode and the closed mode.

4. The computing device of claim 1 wherein the locking arm is to engage the stop when the computing device is in the tablet mode to limit rotation of the base member and the display member relative to each other about the first pivotal axis to prevent the second hinge from contacting the base member.

5. The computing device of claim 1 wherein the locking arm is to engage a protrusion on the display member when the computing device is in the laptop mode, the protrusion to contact the base member in the tablet mode.

6. The computing device of claim 1 further comprising a spring attached between the locking arm and the first hinge, the spring to be in a biased position when the locking arm engages the stop, the spring to be in an unbiased position when the locking arm engages the display member.

7. The computing device of claim 1 wherein the first hinge is a friction hinge having a gudgeon member and a pintle member inserted through the gudgeon member, the stop being attached to the gudgeon member.

8. The computing device of claim 7 wherein the gudgeon member comprises a cylindrical portion, the stop being attached to the cylindrical portion.

9. The computing device of claim 1 further comprising a fastener inserted through the locking arm and rotatably attaching the locking arm to the first hinge.

10. The computing device of claim 1 wherein the locking arm is exposed through an opening in the computing device when the computing device is in the tablet mode.

11. The computing device of claim 1 further comprising a fastener rotatably attaching the locking arm to the first hinge.

12. The computing device of claim 1, wherein:
when transitioning between the closed mode and the laptop mode, the display member is rotated relative to the base member about the first pivotal axis of rotation; and
when transitioning between the laptop mode and the tablet mode, the display member is rotated relative to the base member about the first pivotal axis of rotation and about the second pivotal axis of rotation.

13. The computing device of claim 1, further comprising at least two recesses on the base member that interface with protrusions on the display member to locate the display member relative to the base member.

14. A computing device comprising:
a base member;
a display member;
a hinge assembly comprising a friction hinge, a flexible hinge, and a rigid plate disposed between the friction hinge and the flexible hinge, the hinge assembly being attached between the base member and the display member to rotate the base member and the display member relative to each other about a first pivotal axis of rotation and about a second pivotal axis of rotation to transition the computing device between a laptop mode and a tablet mode;
a stop in the hinge assembly; and
a locking arm to:
engage the stop when the computing device is in the tablet mode to limit rotation of the base member and the display member relative to each other about the first pivotal axis, and
engage the display member when the computing device is in the laptop mode such that the locking arm is not to contact the stop, to allow the base member to contact the display member in a closed mode.

15. The computing device of claim 14 further comprising a spring attached between the locking arm and the friction hinge, the spring to be in a biased position when the locking arm engages the stop, the spring to be in an unbiased position when the locking arm does not engage the stop.

16. The computing device of claim 14, wherein the flexible hinge is a flexible sheet.

17. The computing device of claim 14, wherein:
the locking arm does not contact a protrusion of the display member when the computing device is in the tablet mode;
the locking arm contacts the protrusion of the display member when the computing device is in the laptop mode;
the locking arm does not contact the stop when the computing device is in the closed mode; and
the locking arm contacts the protrusion of the display member when the computing device is in the closed mode.

18. The computing device of claim 14, further comprising a fastener member to secure the hinge assembly to the display member when the computing device is in the closed mode and the laptop mode.

19. A computing device comprising:
a base member;
a display member; and
a first hinge attached to the base member to rotate the base member and the display member relative to each other about a first pivotal axis of rotation to transition the computing device between a laptop mode and a closed mode, the first hinge being a friction hinge; and a second hinge, which is a flexible hinge, attached between the first hinge and the display member to rotate the base member and the display member relative to each other about a second pivotal axis of rotation to transition the computing device between the laptop mode and a tablet mode;

a rigid plate disposed between the first hinge and the second hinge;

a stop in the first hinge;

a locking arm to:
- engage the stop and disengage from a protrusion on the display member when the computing device is in the tablet mode to limit rotation of the base member and the display member relative to each other about the first pivotal axis to prevent the second hinge from contacting the base member; and
- engage the protrusion on the display member and disengage from the stop when the computing device is in the laptop mode and the closed mode, wherein:
- when in the laptop mode, a display screen of the display member is visible and an input device of the base member is accessible; and
- when in the tablet mode, the display screen is facing away from the base member and the input device of the base member is facing toward a backside of the display member.

* * * * *